(12) United States Patent
Okitsu (10) Patent No.: US 7,862,005 B2
(45) Date of Patent: Jan. 4, 2011

(54) FLOW AMOUNT CONTROL VALVE

(75) Inventor: Atsushi Okitsu, Yokohama (JP)

(73) Assignee: SMC Kabushiki Kaisha, Tokyo (JP)

( * ) Notice: Subject to any disclaimer, the term of this patent is extended or adjusted under 35 U.S.C. 154(b) by 407 days.

(21) Appl. No.: 12/026,536

(22) Filed: Feb. 5, 2008

(65) Prior Publication Data

US 2008/0191158 A1 Aug. 14, 2008

(30) Foreign Application Priority Data

Feb. 8, 2007 (JP) ............................. 2007-029225

(51) Int. Cl.
  *G05D 7/01* (2006.01)
(52) U.S. Cl. .................... 251/214; 251/335.3
(58) Field of Classification Search .............. 251/335.3, 251/335.1, 214
  See application file for complete search history.

(56) References Cited

U.S. PATENT DOCUMENTS

| | | | | |
|---|---|---|---|---|
| 600,249 A | * | 3/1898 | Parsells | ....................... 251/264 |
| 1,859,834 A | * | 5/1932 | May | ........................... 251/268 |
| 2,111,230 A | * | 3/1938 | Toussaint | ..................... 251/28 |
| 2,265,496 A | * | 12/1941 | Shaw | ........................ 137/512 |
| 2,376,383 A | * | 5/1945 | Richards | ..................... 137/460 |
| 3,097,662 A | * | 7/1963 | Peters | ........................ 137/338 |
| 3,179,123 A | * | 4/1965 | Kowalski | ..................... 137/495 |
| 3,304,048 A | * | 2/1967 | Roberts | ....................... 251/282 |
| 3,368,791 A | * | 2/1968 | Wells | ....................... 251/129.07 |
| 3,428,291 A | * | 2/1969 | Callahan, Jr. et al. | ....... 251/122 |
| 3,573,863 A | * | 4/1971 | Doors et al. | ............... 251/335.3 |
| 3,646,969 A | * | 3/1972 | Stampfli | ..................... 251/174 |
| 3,985,333 A | * | 10/1976 | Paulsen | ..................... 251/282 |
| 4,482,091 A | * | 11/1984 | Lawsing | .................. 251/335.3 |
| 4,618,092 A | * | 10/1986 | Fukushima et al. | ....... 251/335.3 |
| 5,267,721 A | * | 12/1993 | Stroh | ....................... 251/335.3 |
| 5,345,857 A | * | 9/1994 | Murphy | ..................... 251/335.3 |
| 5,597,009 A | * | 1/1997 | Scherrer et al. | .......... 251/335.3 |
| 5,915,410 A | * | 6/1999 | Zajac | ........................ 251/335.3 |
| 2006/0118753 A1 | * | 6/2006 | Rule | ........................ 251/335.3 |

FOREIGN PATENT DOCUMENTS

| | | |
|---|---|---|
| CN | 2339825 | 9/1999 |
| JP | 11-241668 | 9/1999 |
| JP | 2004-308762 | 11/2004 |
| JP | 2006-57663 | 3/2006 |
| JP | 2006-155133 | 6/2006 |

* cited by examiner

*Primary Examiner*—John Bastianelli
(74) *Attorney, Agent, or Firm*—Paul A. Guss (57) ABSTRACT

In a flow amount control valve, a rod is inserted through the interior of a housing, and first and second connecting members are connected coaxially to both ends of the rod. A first bellows and a second bellows, each having a bellows portion, are provided on the rod, for preventing leakage of fluid that is introduced into the interior of the housing. In addition, the first bellows and the second bellows are expanded and contracted by displacement of the rod along the axial direction, which is caused by driving an actuator, such that a valve element of the rod approaches and separates with respect to a valve seat, and a gap between the valve element and the valve seat changes so that a flow amount of the fluid is controlled.

10 Claims, 9 Drawing Sheets

PRIOR ART

FIG. 9

FLOW AMOUNT CONTROL VALVE

BACKGROUND OF THE INVENTION

1. Field of the Invention

The present invention relates to a flow amount control valve, which is capable of controlling a flow amount of a pressure fluid that flows through and between a pair of ports, by axial displacement of a rod possessing a valve element.

2. Description of the Related Art

Heretofore, a flow amount control valve has been known, in which an inner cylinder, having a threaded part on an inner circumferential surface thereof, is disposed rotatably inside of a valve housing. At the interior of the inner cylinder, a valve body is fixed at one end thereof, and a valve shaft having a threaded part on an outer circumferential surface thereof is inserted, wherein the inner cylinder and the valve shaft are screw engaged mutually with each other.

Figure 9:
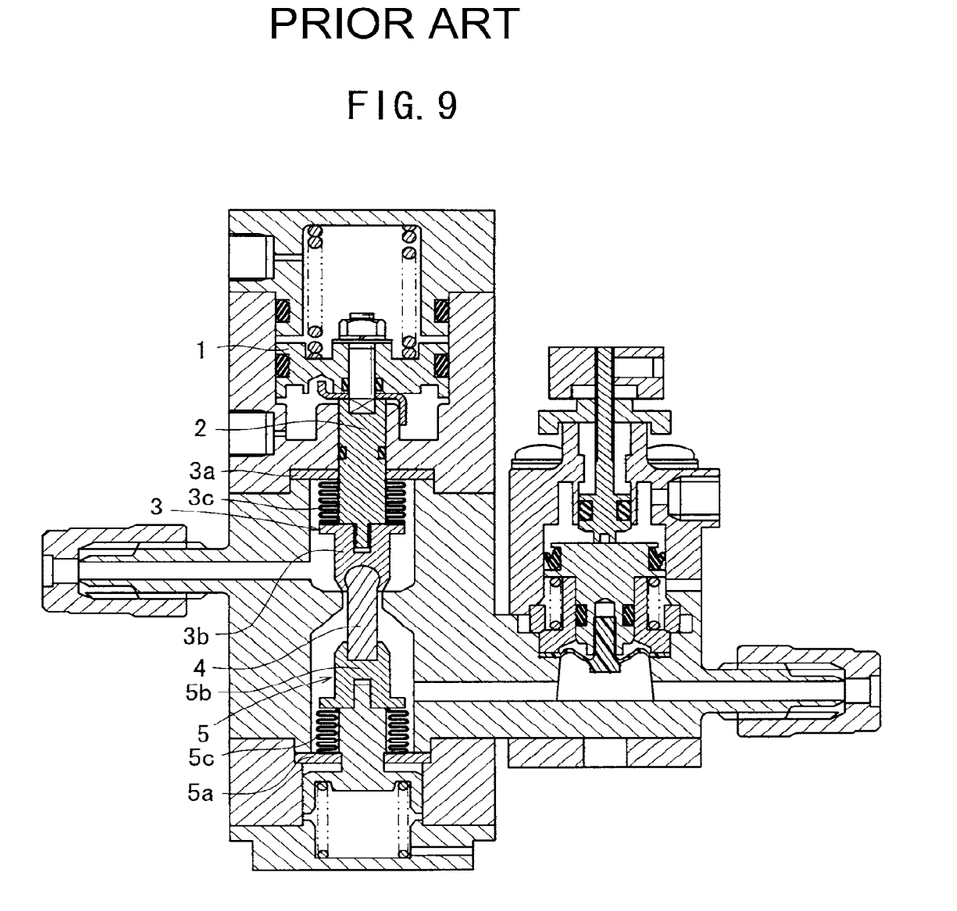
FIG. 9 is an overall cross sectional view of a flow amount control valve according to a conventional technique.

In such a flow amount control valve disclosed in Japanese Laid-Open Patent Publication No. 2006-057663, as shown in FIG. 9 of the present application, a piston 1 is provided, which is displaceable under the supply of a pressure fluid, and a control side bellows valve body 3 is engaged on a lower end of a sliding shaft 2 that is connected to the piston 1. Further, a compensation side bellows valve body 5 is connected to a lower portion of the control side bellows valve body 3 through a connecting rod 4. The control side bellows valve body 3 includes a flexible bellows portion 3c, which is connected to a fixed mounting member 3a and a columnar member 3b, whereas the compensation side bellows valve body 5 includes a flexible bellows portion 5c, which is connected to a fixed mounting member 5a and a columnar member 5b. In addition, while the bellows portions 3c, 5c are caused to expand and contract through displacement of the piston 1, the control side bellows valve body 3 and the compensation side bellows valve body 5 are displaced.

With the aforementioned conventional technique, the control side bellows valve body 3 and the compensation side bellows valve body 5 are mutually connected through the connecting rod 4. One end of the connecting rod 4 abuts against and is supported by a hemispherical surface on a recess of the columnar member 3b making up the control side bellows valve body 3, and the other end thereof is inserted through and supported within a recess of the columnar member 5b making up the compensation side bellows valve body 5.

However, because the control side bellows valve body 3 and the compensation side bellows valve body 5 are not each respectively connected completely with respect to the connecting rod 4, there is a concern that the control side bellows valve body 3, the connecting rod 4 and the compensation side bellows valve body 5 tend to deviate or shift perpendicularly and become off-centered. Stated otherwise, because the control side bellows valve body 3 and the connecting rod 4 are merely in abutment with each other by means of the semispherical surface that simply abuts in the recess, and displacement in the direction perpendicular to the axis thereof is not regulated in any way, it is problematic and difficult for the control side bellows valve body 3 and the connecting rod 4 to remain arranged on the same axis.

Owing thereto, the control side bellows valve body 3 and the compensation side bellows valve body 5 tend to shift relatively through the flexible bellows portions 3c, 5c out of alignment in the perpendicular direction with respect to the axis, and it is difficult for the control side bellows valve body 3 and the compensation side bellows valve body 5 to be displaced in a straight line along the axial direction. As a result, accuracy of the flow amount control performed by the control side bellows valve body 3 and the compensation side bellows valve body 5 tends to be deteriorated.

SUMMARY OF THE INVENTION

A general object of the present invention is to provide a flow amount control valve, which carries out a flow amount control of a fluid with high accuracy, and which is superior in terms of durability.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
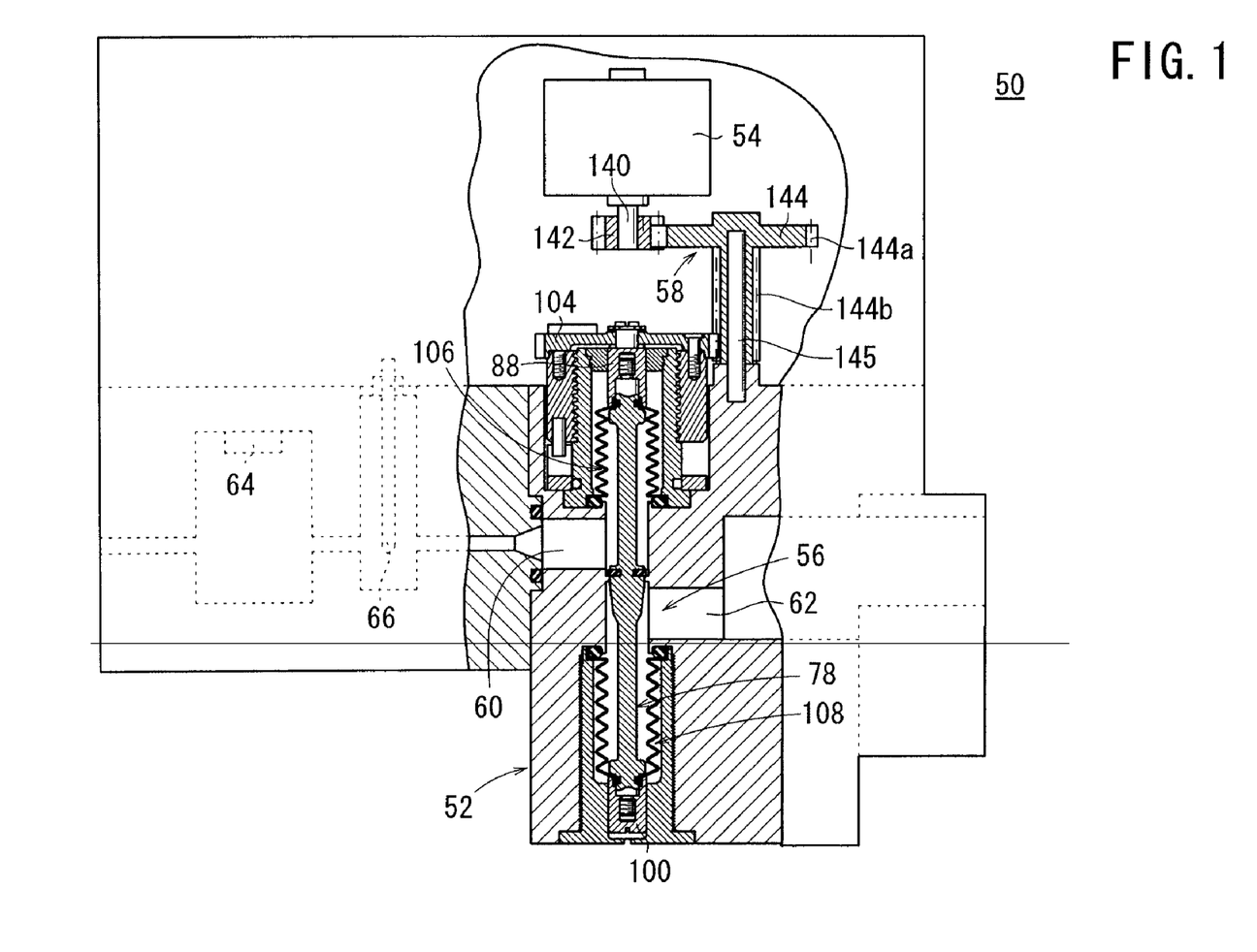
FIG. 1 is a schematic block structural view, with partial omission, illustrating a flow amount control valve according to a first embodiment of the present invention.
Figure 2:
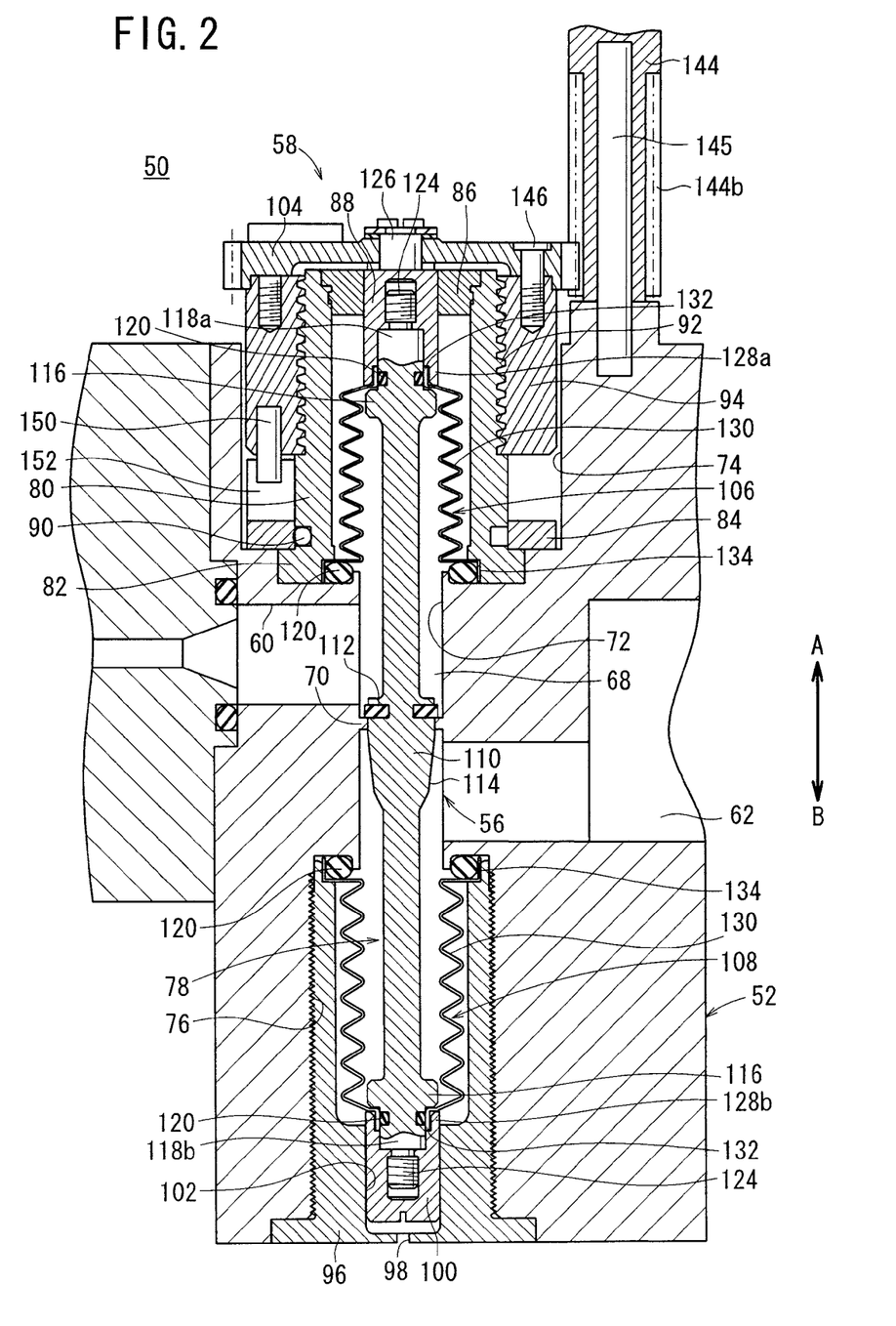
FIG. 2 is an enlarged vertical cross sectional view of essential elements in the flow amount control valve of FIG. 1.

As shown in FIGS. 1 and 2, the flow amount control valve 50 according to the first embodiment includes a housing 52, an actuator 54 disposed on the housing 52 and constituted, for example, by a stepping motor, a valve mechanism 56 driven by a rotational driving force of the actuator 54, and a drive force transmission mechanism 58, which transmits the rotational driving force of the actuator 54 to the valve mechanism 56.

Further, the flow amount control valve 50 comprises an inlet port (port) 60 formed in the housing 52 through which a fluid (e.g., purified water) is introduced, an outlet port (port) 62 through which the fluid is discharged, the flow amount of the fluid being controlled by the valve mechanism 56, a flow amount sensor 64 arranged inside the inlet port 60, which detects a flow amount of the introduced fluid, and a temperature sensor 66 arranged downstream from the flow amount sensor 64 inside the inlet port 60 for detecting the fluid temperature.

A valve opening 68 that extends vertically (in the direction of arrows A and B) is formed in the housing 52 in a substantially central portion thereof. The valve opening 68 includes a small diameter portion 72 having a valve seat 70 that projects radially inward, and first and second large diameter portions 74, 76 disposed on both ends of the small diameter portion 72 and which are expanded in diameter radially outward with respect to the small diameter portion 72. Further, a rod 78, which constitutes a valve mechanism 56, is inserted through the valve opening 68 so as to be displaceable therein.

In the valve opening 68, a cylindrical fixed member 80 is disposed in a first large diameter portion 74 at the upper side (in the direction of the arrow A) of the small diameter portion 72. An attachment portion 82, which is formed on a lower end of the fixed member 80, is fixed to the housing 52 through a ring shaped pedestal 84. A disk shaped cap 86 is mounted on an upper portion of the fixed member 80, and a first connecting member (guide member) 88 constituting the valve mechanism 56 is maintained displaceably therein.

Further, balls 90 are arranged along the inner circumferential surface of the pedestal 84. The balls 90 function as a ratchet mechanism, the balls 90 being latched with respect to the outer circumferential surface of the fixed member 80. In addition, the fixed member 80 is disposed so as to be capable of being positioned at an angular position, rotatable by a fixed angle (e.g., 45°) with respect to the pedestal 84.

Further, threads 92 are engraved in a circumferential direction on an outer circumferential surface of the fixed member 80, which are screw-engaged with a tubular body 94 of the drive force transmission mechanism 58.

On the other hand, in the valve opening 68, a cylindrical end cover 96 is installed in a second large diameter portion 76 on a lower side (in the direction of the arrow B) of the small diameter portion 72. The valve opening 68 including the second large diameter portion 76 thereof is closed by the end cover 96. Further, an exhaust hole 98 that penetrates along the axial direction (the direction of arrows A and B) is formed in the end cover 96. An insertion hole 102, through which a second connecting member (guide member) 100 is inserted, communicates with the exterior through the exhaust hole 98. The second large diameter portion 76 is formed to have a smaller diameter than the first large diameter portion 74.

The inlet port 60 extends in a substantially horizontal direction with respect to the housing 52, and is connected and communicates with respect to the small diameter portion 72 upwardly of the valve seat 70. The outlet port 62 extends in a substantially horizontal direction along an opposite side from the inlet port 60, and is connected and communicates with respect to the small diameter portion 72 downwardly from the valve seat 70.

The valve mechanism 56 includes an elongate rod 78 that extends lengthwise in the axial direction, the first connecting member 88 connected to an upper end of the rod 78 and supporting a main gear 104 of the drive force transmission mechanism 58, the second connecting member 100 connected to a lower end of the rod 78, which is inserted displaceably through an interior part of the end cover 96, and first and second bellows 106, 108 supported respectively between the first and second connecting members 88, 100 and the rod 78.

The rod 78 includes a valve element 110 disposed substantially centrally along the axial direction of the rod 78. A seat member 112, which is seatable on a valve seat 70, is installed onto the valve element 110. Further, the seat member 112 is formed from an elastic material such as rubber, for example.

Further, the valve element 110 is formed in a conical shape, having a tapered surface 114 that gradually reduces in diameter downwardly (in the direction of the arrow B). More specifically, concerning the tapered surface 114 constituting the valve element 110, by displacement of the rod 78 toward the valve seat 70 (in the direction of the arrow B) from a state separated away from the valve seat 70, the separation distance (gap) between the tapered surface 114 and the valve seat 70 gradually lessens, so that ultimately, the tapered surface 114 intimately contacts the inner circumferential surface of the valve seat 70. Owing thereto, the seat member 112 abuts against the valve seat 70, and a valve-closed state is attained in which the flow of fluid through the gap between the valve element 110 and the valve seat 70 is interrupted.

Moreover, the rod 78 extends, with substantially the same diameter, toward both respective ends thereof about the centrally disposed valve element 110 thereof. Flanges 116, which are expanded in diameter, are disposed on both end portions of the rod 78, and connecting shafts 118a, 118b are formed thereon which project with respect to the flanges 116. Sealing rings 120 are installed into annular grooves that are disposed on the outer circumferential surfaces of the connecting shafts 118a, 118b, and the connecting shafts 118a, 118b are inserted respectively into holes of the first and second connecting members 88, 100. In addition, threaded parts 124 that are formed on ends of the connecting shafts 118a, 118b are threaded into the first and second connecting members 88, 100.

As a result, the first and second connecting members 88, 100 are connected to both ends of the rod 78. At this time, respective axes of the rod 78 and the first and second connecting members 88, 100 are connected together coaxially along a straight line.

The first connecting member 88 is connected to an upper end of the rod 78 via the connecting shaft 118a, and the shaft 126 thereof, which projects upwardly (in the direction of the arrow A), is inserted through the hole of the cap 86, rotatably supporting the main gear 104 constituting the drive force transmission mechanism 58. Further, the first connecting member 88 is inserted displaceably through the hole of the cap 86, and is guided in the axial direction (the direction of arrows A and B).

The second connecting member 100 is connected to a lower end of the rod 78 via the connecting shaft 118b, and is inserted displaceably through the insertion hole 102 of the end cover 96.

Further, collars 128a, 128b, each of which project with annular shapes toward the rod 78, are provided on end portions of the first and second connecting members 88, 100. Front end parts 132 of the first and second bellows 106, 108 are inserted and maintained between the collars 128a, 128b and the outer circumferential surface of the rod 78.

Figure 3:
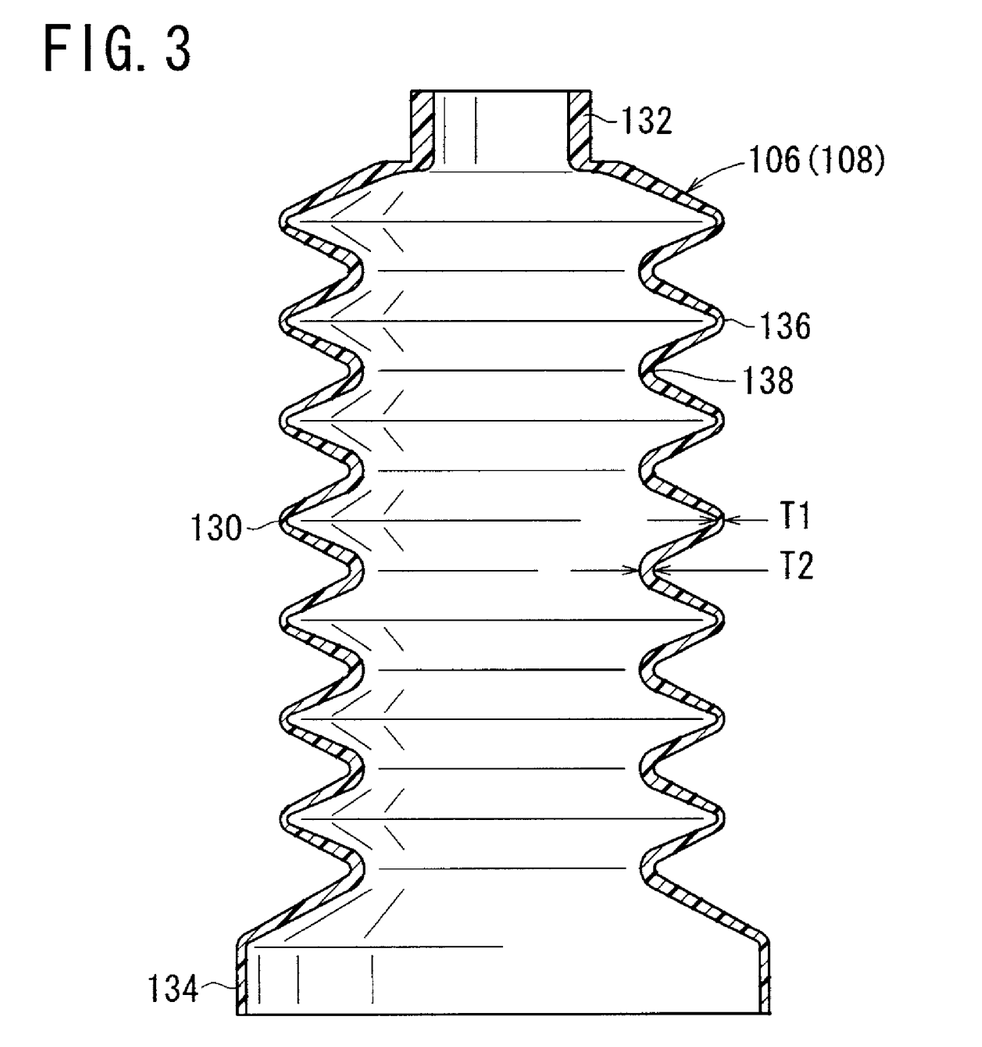
FIG. 3 is a simple vertical cross sectional view of the first and second bellows that make up a valve mechanism in the flow amount control valve of FIG. 2.

The first and second bellows 106, 108 are formed from a resin material such as polypropylene (PP) or the like and, as shown in FIG. 3, each include a bellows portion 130 having a tubular shape, which is bent in a wave-like form, an annular front end part 132 formed on one end of the bellows portion 130 and reduced in diameter in a radially inward direction, and an annular rear end part 134 formed on the other end of the bellows portion 130, which is slightly expanded in diameter in a radially outward direction with respect to the bellows portion 130.

Moreover, the first and second bellows 106, 108 are formed substantially in the same shape, with the front end part 132 and the rear end part 134 thereof being opened. The front end part 132 is formed to be smaller in diameter than the rear end part 134.

The first and second bellows 106, 108 are formed generally by blow formation, wherein a molten resin material is pushed into a tubular mold, and the material is pressed against the inner wall surface and hardened by blowing a fluid into the interior of the mold.

The bellows portion 130, as shown in FIG. 3, includes projecting parts 136, which project radially outward with substantially triangular shapes in cross section, and recessed parts 138 adjacent to the projecting parts 136, which are recessed radially inward with substantially triangular shapes in cross section, such that the plural projecting parts 136 and recessed parts 138 are disposed alternately and continuously. As a characteristic of blow formation, portions of the material that are introduced to the interior of the bellows portion 130 are pressed radially outward by a pressure fluid, whereas the remainder of the material remains radially inward. In this case, the wall thickness T2 of the radially inward disposed recessed parts 138 is formed to be slightly larger, compared to the wall thickness T1 of the radially outward projecting parts 136 (i.e., as shown in FIG. 3, T1<T2).

Figure 4:
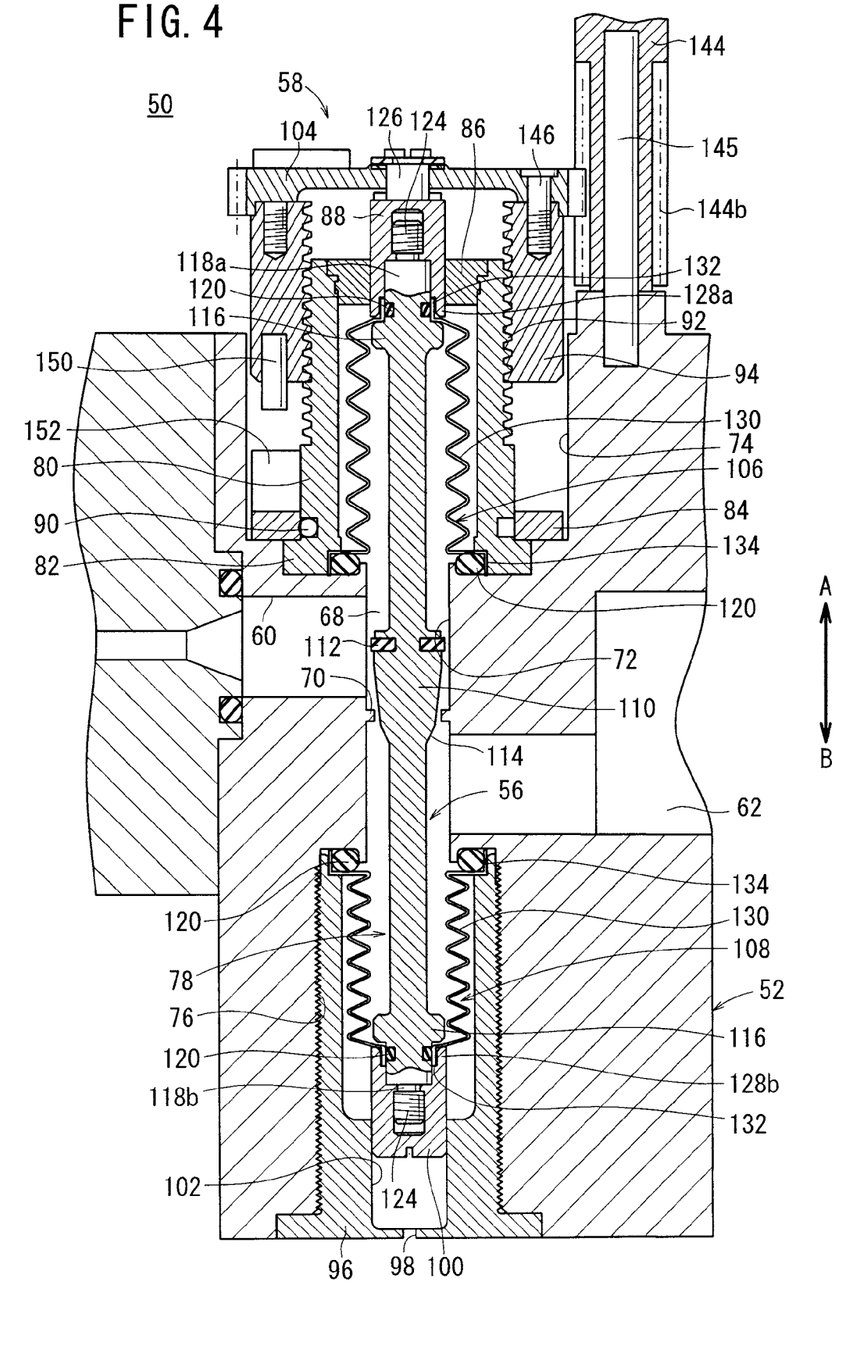
FIG. 4 is an enlarged vertical cross sectional view of essential elements, showing a valve-open state of the flow amount control valve of FIG. 2.

As shown in FIGS. 2 and 4, the front end part 132 of the first bellows 106 is arranged on the side of the first connecting member 88, whereas the rear end part 134 thereof is arranged in the first large diameter portion 74 of the valve opening 68, so as to reside on a side of the valve seat 70 (in the direction of the arrow B). The front end part 132 of the second bellows 108 is arranged on the side of the second connecting member 100, whereas the rear end part 134 thereof is arranged in the second large diameter portion 76 of the valve opening 68, so as to reside on another side of the valve seat 70 (in the direction of the arrow A).

In this case, the first and second bellows 106, 108 are arranged respectively in a non-contact manner with respect to the inner circumferential surfaces of the fixed member 80 and the end cover 96, which are disposed in the first and second large diameter portions 74, 76. In addition, the cylindrically shaped front end parts 132 are maintained between the collars 128a, 128b of the first and second connecting members 88, 100 and the outer circumferential surfaces of the connecting shafts 118a, 118b, in which sealing rings 120 are installed.

Further, in the first and second bellows 106, 108, the connected region between the front end part 132 and the bellows portion 130 is held in abutment against the end surfaces of the flanges 116 of the rod 78. More specifically, radial outward displacement of the aforementioned front end parts 132 is regulated by the collars 128a, 128b of the first and second connecting members 88, 100, whereas axial displacement thereof (in the directions of arrows A and B) is regulated by the flanges 116.

On the other hand, as shown in FIG. 3, the rear end part 134 of the first and second bellows 106, 108 is bent substantially at a right angle in the axial direction with respect to the end of the bellows portion 130, and a sealing ring 120 is arranged at the inner circumferential side thereof (see FIG. 2). Additionally, the rear end part 134 of the first bellows 106 is gripped between the housing 52 and the attachment portion 82 of the fixed member 80, at a state in which the sealing ring 120 is accommodated inside the rear end part 134. On the other hand, the rear end part 134 of the second bellows 108 is gripped between the housing 52 and an end portion of the end cover 96, at a state in which the sealing ring 120 is accommodated inside the rear end part 134.

More specifically, in the first and second bellows 106, 108, the front end parts 132 thereof are held on the rod 78 through the first and second connecting members 88, 100, whereas the rear end parts 134 are fixed with respect to the housing 52. Owing thereto, only the front end parts 132 are displaced together with the rod 78, accompanied by expanding and contracting displacements of the bellows portions 130.

The drive force transmission mechanism 58 is made up from a drive gear 142, which is fixed to a drive shaft 140 of the actuator 54, an intermediate gear 144 meshed with the drive gear 142, and a main gear 104 meshed with the intermediate gear 144, which transmits a rotational drive force from the actuator 54 to the valve mechanism 56 including the rod 78.

The intermediate gear 144 includes a large diameter toothed portion 144a meshed with the drive gear 142, and a small diameter toothed portion 144b meshed with the main gear 104. The intermediate gear 144 is supported rotatably on the housing 52 through a spindle 145.

The main gear 104 is supported rotatably on a shaft 126 of the first connecting member 88, such that the toothed portion disposed around the outer circumferential surface thereof is meshed with the small diameter toothed portion 144b of the intermediate gear 144. A cylindrically shaped tubular body 94 is connected through bolts 146 to a lower surface of the main gear 104 that faces toward the housing 52.

The tubular body 94 is inserted through the interior of the first large diameter portion 74, and has a threaded portion on the inner circumferential surface thereof, which is screw-engaged with the threads 92 of the fixed member 80. In addition, the tubular body 94 is displaceable along the axial direction under a screwing action thereof with respect to the fixed member 80. More specifically, the first connecting member 88, the rod 78, the main gear 104 and the tubular body 94 are disposed so as to reside on the same axis.

Further, a stopper pin 150, which projects downwardly, is disposed at a lower portion of the tubular body 94. When the tubular body 94 is rotated upon rotation of the actuator 54, a stopper block 152 disposed on the first large diameter portion 74 engages with and stops the stopper pin 150. As a result, the stopper mechanism made up of the stopper pin 150 and the stopper block 152 prevents rotation of the tubular body 94, when the tubular body 94 is at a lowermost position of the first large diameter portion 74, and further downward displacement of the tubular body 94 from a predetermined lowermost position is prevented.

In this manner, by rotating the main gear 104 by driving the actuator 54, the tubular body 94, which is screw-engaged with the fixed member 80, is displaced along the axial direction (the direction of arrows A and B) together with the main gear 104, whereupon the first connecting member 88, which maintains the main gear 104, also is displaced along the axial direction. As a result, the rod 78 connected to the first connecting member 88, and the second connecting member 100, are displaced along the axial direction inside the housing 52.

The flow amount control valve 50 in accordance with the first embodiment of the present invention is constructed basically as described above. Next, operations and effects of the flow amount control valve 50 shall be explained. At this time, when the flow amount control valve 50 is in a valve-closed state, as shown in FIG. 2, the valve element 110 disposed on the rod 78 is seated on the valve seat 70, and fluid flow is interrupted by blocking communication between the inlet port 60 and the outlet port 62.

From the valve-closed state in which communication between the inlet port 60 and the outlet port 62 is interrupted, when the flow amount control valve 50 is opened, first, the actuator 54 is driven and rotated, and under a rotary action of the drive shaft 140, the drive gear 142 and the intermediate gear 144 are rotated in succession, whereby a rotational driving force is transmitted to the main gear 104. In addition, by rotation of the tubular body 94 together with the main gear 104, the tubular body 94 is displaced upwardly (in the direction of the arrow A) along the fixed member 80, with which the tubular body 94 is screw-engaged.

Because the main gear 104 is supported so as to be capable of displacement relatively with respect to the first connecting member 88 that is connected to the rod 78, even if the main gear 104 and the tubular body 94 are rotated, the first connecting member 88 does not rotate and simply is displaced in the axial direction.

Additionally, accompanying upward movement of the tubular body 94, the rod 78 is elevated via the first connecting member 88, whereupon by separation of the valve element 110 from the valve seat 70, the inlet port 60 communicates with the outlet port 62 through the gap formed between the valve element 110 and the valve seat 70 (see FIG. 4). The fluid (e.g., purified water), which is introduced from the inlet port 60, passes through the interior of the valve opening 68 and is led out from the outlet port 62.

In this case, as shown in FIG. 4, because the front end part 132 of the first bellows 106 is displaced upwardly (in the direction of the arrow A) together with the rod 78, the first bellows 106 changes in shape, such that it expands with respect to the rear end part 134, and fluid is introduced into the interior of the first bellows 106, which communicates with the small diameter portion 72 making up the valve opening 68.

On the other hand, because the front end part 132 of the second bellows 108 is displaced upwardly (in the direction of the arrow A) together with the rod 78, the second bellows 108 changes in shape so as to contract with respect to the rear end part 134 thereof, while fluid is introduced into the interior of the second bellows 108 that communicates with the small diameter portion 72. Stated otherwise, in the first and second bellows 106, 108, the pressure of the fluid is imposed in a radially outward direction with respect to inner wall surfaces thereof.

Further, because sealing rings 120 are installed between the housing 52 and the rear end parts 134 of the first and second bellows 106, 108, leakage of fluid outside of the first and second bellows 106, 108 is prevented.

In addition, when the actuator 54 is rotated and driven further thereby rotating the tubular body 94 in the same direction, by upward displacement of the rod 78 (in the direction of the arrow A), the gap between the valve element 110 and the valve seat 70 gradually increases along the tapered surface 114 of the valve element 110, and owing thereto, an even greater amount of fluid is led out to the outlet port 62 through the gap. That is, the flow amount of the fluid can easily be controlled by means of the valve element 110 having the tapered surface 114.

On the other hand, in the event that the flow amount of fluid is to be restricted or throttled, from the valve-open condition in which the valve element 110 is separated from the valve seat 70, the characteristics (i.e., polarity) of the electric signal to the actuator 54 is reversed, and the actuator 54 is driven and rotated in an opposite direction to that described above. In addition, the rotational drive force is transmitted to the main gear 104 from the actuator 54, the drive gear 142 and the intermediate gear 144, whereupon, by rotation of the tubular body 94 together with the main gear 104, the tubular body 94 is displaced downward (in the direction of the arrow B) along the fixed member 80.

Additionally, accompanying downward movement of the tubular body 94, the rod 78 descends via the first connecting member 88, whereupon since the valve element 110 approaches toward the valve seat 70, the gap formed between the valve element 110 and the valve seat 70 becomes smaller, and the flow amount of fluid that flows from the inlet port 60 to the outlet port 62 decreases. In this case, because the front end part 132 of the first bellows 106 is displaced downward (in the direction of the arrow B) together with the rod 78, the first bellows 106 changes in shape while being compressed with respect to the rear end part 134 thereof. Along therewith, because the front end part 132 of the second bellows 108 is displaced downward (in the direction of the arrow B) together with the rod 78, the second bellows 108 changes in shape while expanding with respect to the rear end part 134 thereof.

Finally, when the actuator 54 is rotated and driven further thereby rotating the tubular body 94 in the same direction, by downward displacement of the rod 78, the valve element 110 is seated on the valve seat 70 and communication between the inlet port 60 and the outlet port 62 is blocked, and thus a valve-closed state is attained, in which flow of the fluid is interrupted (see FIG. 2).

In the foregoing manner, according to the first embodiment, first and second bellows 106, 108 having respective bellows portions 130 are disposed on both ends of the rod 78 that constitutes the valve mechanism 56. The front end parts 132 thereof are supported and maintained by the rod 78, whereas the rear end parts 134 are fixed to the housing 52. Consequently, fluid that is introduced into the valve opening 68 of the housing 52 is introduced in turn into interior portions of the first and second bellows 106, 108, while leakage of fluid outside of the valve opening 68 is prevented.

Further, since the first and second bellows 106, 108 are arranged in a non-contact state with respect to the valve opening 68 of the housing 52, even when the first and second bellows 106, 108 are expanded and contracted upon displacement of the rod 78, the first and second bellows 106, 108 are not displaced in a sliding manner with respect to the inner circumferential surface of the valve opening 68, and thus the rod 78 is quickly and smoothly displaced, so that a flow amount control can be carried out smoothly by the valve element 110.

Furthermore, because the paired first and second bellows 106, 108 are disposed on both ends of the rod 78, the rod 78 can be balanced easily along the axial direction (the direction of arrows A and B) inside the housing 52. Owing thereto, when the rod 78 is displaced, the drive force of the actuator 54 can be reduced, accompanied by a reduction in load imposed on the tubular body 94 and the fixed member 80, which are screw-engaged and transmit the drive force to the rod 78.

Still further, in the event, for example, that a packing were disposed on an outer circumferential region of the rod 78, wherein the packing abuts against the valve opening 68 of the housing 52 to perform sealing, there is a concern that the packing may cause abrasion and generation of debris, due to sliding resistance thereof with the valve opening 68. Together with this concern, in the event that, for some reason, foreign matter were mixed in with the fluid, such foreign matter would enter between the packing and the valve opening 68, thereby promoting abrasion of the packing and degrading the sealing ability thereof.

By contrast, in the aforementioned flow amount control valve 50, the first and second bellows 106, 108, which are provided in place of such a packing, are not slidably displaced with respect to the valve opening 68. Therefore, wear and abrasion of the first and second bellows 106, 108 can be suppressed, together with preventing generation of debris or the like that would accompany such sliding displacement. Further, even in the case that foreign matter or the like is mixed in with the fluid that flows through the valve opening 68, because the first and second bellows 106, 108 are in a non-contact state with respect to the valve opening 68, wedging of such foreign matter between the first and second bellows 106, 108 and the valve opening 68 is prevented. Along therewith, abrasion of the first and second bellows 106, 108 does not occur, and hence the sealing ability of the first and second bellows 106, 108 can be suitably maintained.

As a result, the durability of the valve mechanism 56 including the first and second bellows 106, 108 is not deteriorated and the operating life thereof can be made longer. Concerns over invasion of debris or the like into the fluid, which could be generated in the case that the aforementioned packing was used, also are avoided. Further, even in the event that some foreign matter or debris is mixed in with the fluid, the fluid sealing ability is maintained and not decreased.

Furthermore, by threaded engagement and attachment of the first and second connecting members 88, 100 respectively to both ends of the rod 78 having the valve element 110, the rod 78 can be arranged easily on the same axis with respect to the valve opening 68 of the housing 52 through the first and second connecting members 88, 100, which are centered beforehand. Owing thereto, the axial centers of the valve seat 70 of the housing 52 and the rod 78 are arranged in a matched state with each other, and by displacement of the rod 78, the flow amount of fluid that flows between the valve element 110 and the valve seat 70 can be controlled highly precisely.

Stated otherwise, the rod 78 is arranged inside the housing 52, and by connection of the first and second connecting members 88, 100, since the valve element 110 and the valve seat 70 are arranged coaxially, it is unnecessary to perform positioning of the valve seat 70 and the rod 78 including the valve element 110 thereon. Therefore, the number of assembly steps required for assembling the flow amount control valve 50 including the valve mechanism 56 can be reduced.

Still further, because the rod 78 is connected, through the connecting shaft 118a formed at the upper part of the rod 78, to the first connecting member 88 that supports the main gear 104 of the drive force transmission mechanism 58, the rod 78 can be rapidly displaced by the driving force, which is transmitted through the drive force transmission mechanism 58. Owing thereto, responsiveness of the flow amount control, in accordance with displacement of the valve element 110 disposed on the rod 78, can be improved.

Furthermore, when the fluid introduced into the valve opening 68 of the housing 52 is introduced into the interiors of the first and second bellows 106, 108, the pressure of the fluid is imposed on the inner wall surfaces of the first and second bellows 106, 108, and such pressure can be suitably received by the recessed parts 138, having a larger wall thickness with respect to the projecting parts 136, that constitute the bellows portion 130, which is formed by means of blow formation. As a result, because deformation of the bellows portions 130 of the first and second bellows 106, 108 by the fluid pressure is suppressed, and the load on the bellows portion 130 is alleviated, an improvement in durability of the first and second bellows 106, 108 is enabled.

Figure 5:
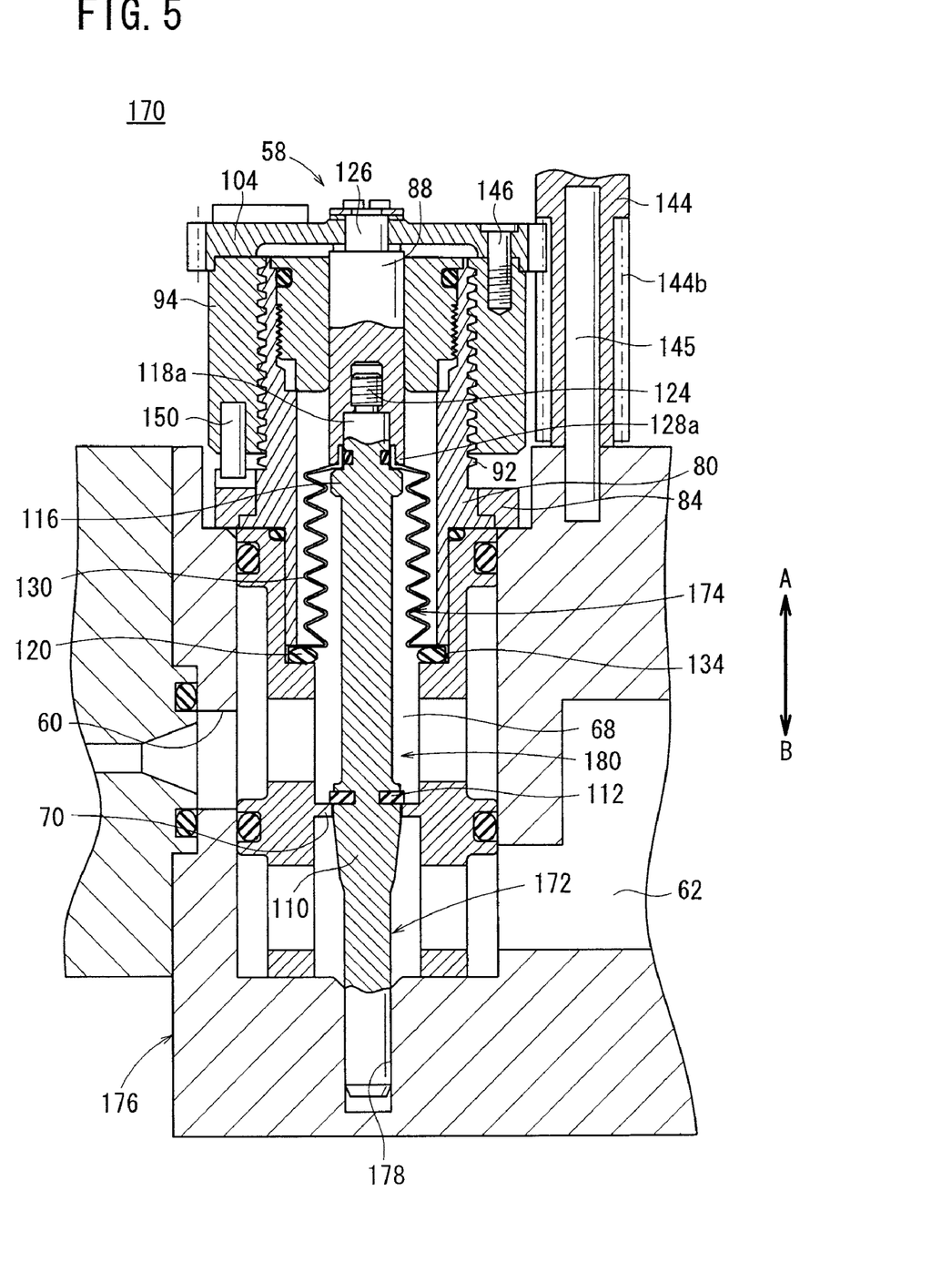
FIG. 5 is an enlarged vertical cross sectional view of essential elements, showing a modified example of the flow amount control valve illustrated in FIG. 2.

Further, in the above-described flow amount control valve 50 according to the first embodiment, a structure has been described in which paired first and second bellows 106, 108 are disposed with respect to the rod 78 about a centrally arranged valve element 110. However, the present invention is not limited to such a structure. For example, in the flow amount control valve 170, as shown in FIG. 5, a structure comprising a single bellows 174 may also be provided, which is disposed on an upper end of the rod 172. In this case, the lower end of the rod 172 is supported so as to be displaceable in the axial direction with respect to a guide hole 178 disposed in the housing 176.

By adopting such a structure, the valve mechanism 180 including the bellows 174 is simplified and the number of parts making up the valve mechanism 180 can be reduced. Also, the number of assembly steps required to assemble the valve mechanism 180 can be reduced.

Figure 6:
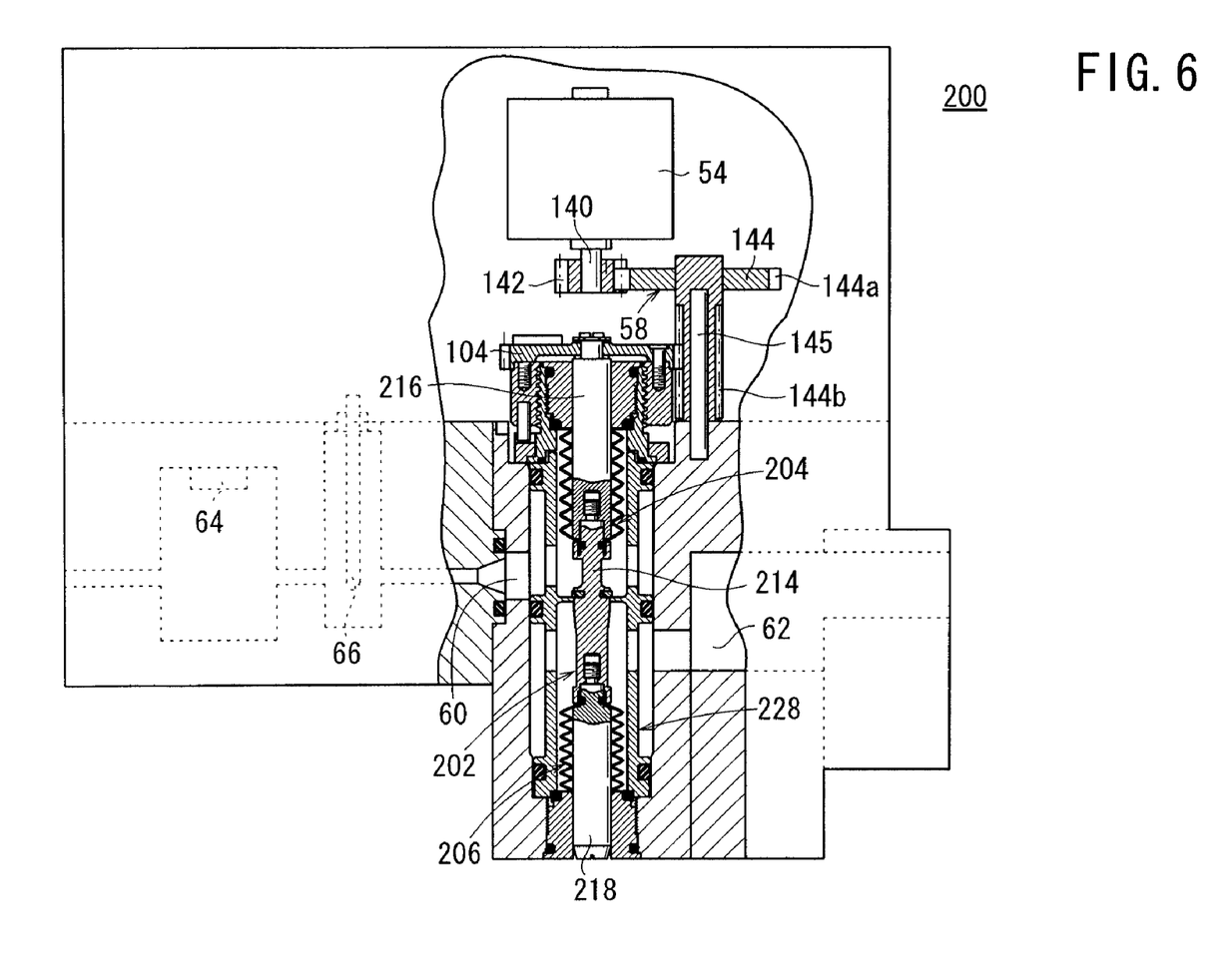
FIG. 6 is a schematic block structural view, with partial omission, illustrating a flow amount control valve according to a second embodiment of the present invention.
Figure 7:
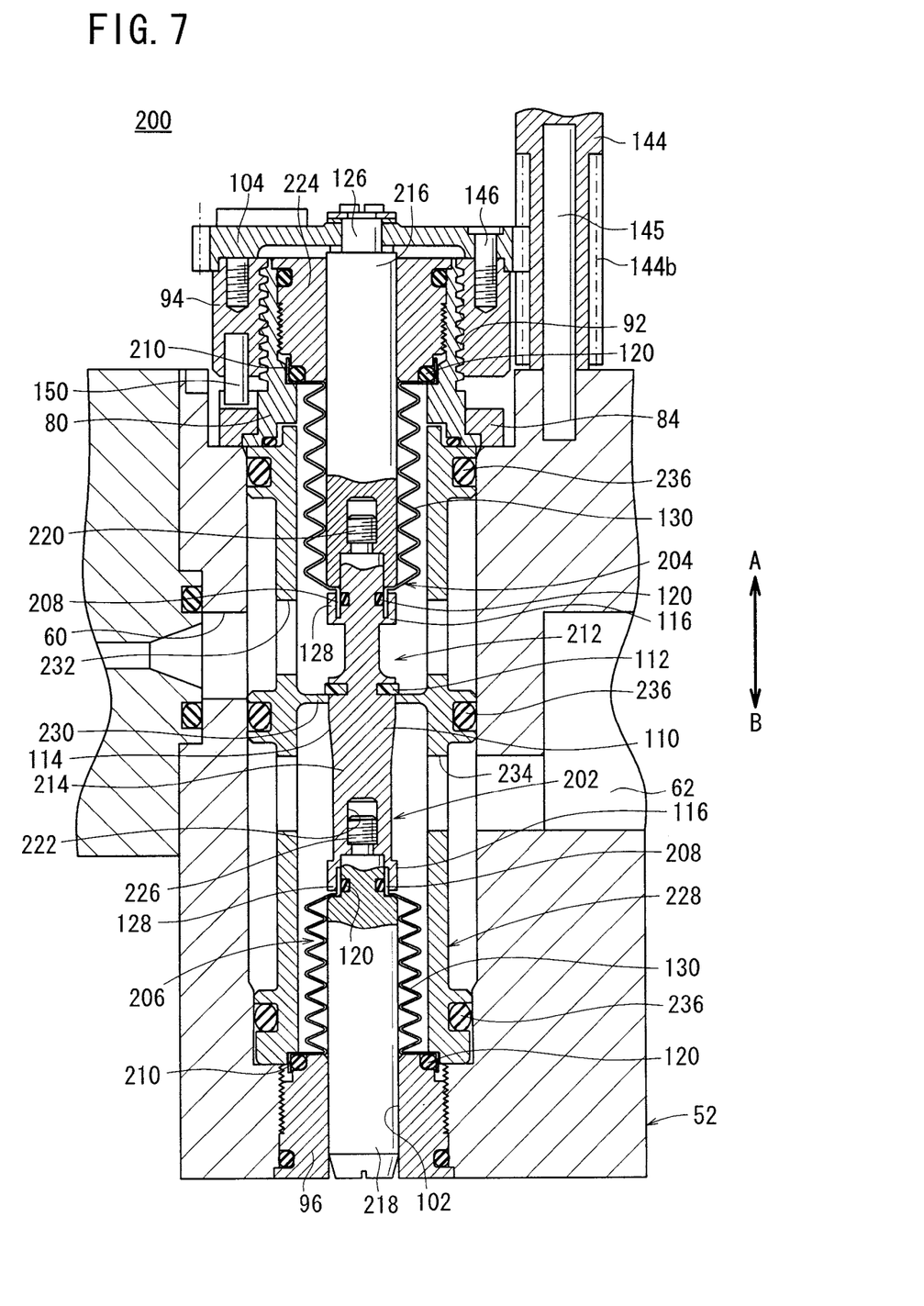
FIG. 7 is an enlarged vertical cross sectional view of essential elements in the flow amount control valve of FIG. 6.

Next, a flow amount control valve 200 according to a second embodiment is shown in FIGS. 6 and 7. Structural elements thereof, which are the same as those of the flow amount control valve 50 according to the above-described first embodiment, are designated by the same reference numerals and detailed explanation of such features shall be omitted.

The flow amount control valve 200 according to the second embodiment differs from the flow amount control valve 50 of the first embodiment, in that in first and second bellows 204, 206 supported on the rod 202, the front end parts 208 thereof are arranged so as to face mutually toward each other on the side of the valve element 110 of the rod 202, and the rear end parts 210 thereof are arranged so as to be separated mutually from each other on both end sides of the valve opening 212.

In the flow amount control valve 200, the rod 202 that is inserted through the interior of the housing 52 is made up of a main rod 214 including the valve element 110, a first sub-rod 216 connected to an upper part of the main rod 214 and supporting the main gear 104 constituting the drive force transmission mechanism 58, and a second sub-rod 218 connected to a lower part of the main rod 214, which is supported in an insertion hole 102 of the end cover 96.

A tapered surface 114 that gradually reduces in diameter downwardly from the valve element 110 is formed on an outer circumferential surface of the main rod 214. On an upper portion of the main rod 214 facing the first sub-rod 216, a connecting shaft 220 is formed, which projects through a flange 116 that is expanded in diameter in a radial outward direction. The first sub-rod 216 is connected to the connecting shaft 220. Further, on a lower portion of the main rod 214 facing the second sub-rod 218, a hole 222 is formed, which opens toward the side of the second sub-rod 218 (in the direction of the arrow B).

The front end part 208 of the first bellows 204 is inserted into and held on an end surface of the flange 116.

The first sub-rod 216 is formed in a shaft-like shape having a substantially uniform diameter. The lower end of the first sub-rod 216 is connected to the connecting shaft 220 of the main rod 214, which is screw-engaged in a hole. In this manner, the first sub-rod 216 and the main rod 214 are connected coaxially. Further, the first sub-rod 216 is maintained displaceably in a hole of a cap 224 that is mounted in the fixed member 80, and a shaft 126 is formed on an upper end of the first sub-rod 216, on which the main gear 104 is rotatably supported.

The second sub-rod 218 also is formed in a shaft-like shape having a substantially uniform diameter, and an upper end of the second sub-rod 218 includes a connecting shaft 226 thereon, which is screw-engaged in a hole 222 of the main rod 214. Specifically, the second sub-rod 218 is connected coaxially with the main rod 214 through the connecting shaft 226, such that the first and second sub-rods 216, 218 are connected together coaxially with the main rod 214.

On the other hand, the valve opening 212 penetrates through the housing 52 with a substantially uniform diameter, and a cylindrically shaped guide body 228 is installed in the valve opening 212. The guide body 228 includes a valve seat 230 that projects radially inward at a substantially central portion along the axial direction (the direction of arrows A and B), an introduction port 232 disposed on an upward side (in the direction of the arrow A) with respect to the valve seat 230, through which the fluid introduced from the inlet port 60 is directed into the interior of the guide body 228, and a lead out port 234 disposed on a downward side (in the direction of the arrow B) with respect to the valve seat 230, through which the fluid that has been introduced into the guide body 228 is led out to the exterior.

Further, plural sealing members 236, which are separated at given intervals along the axial direction, are disposed on the outer circumferential surface of the guide body 228. Through abutment of the sealing members 236 against the inner circumferential surface of the valve opening 212, leakage of fluid from between the guide body 228 and the housing 52 is prevented. More specifically, the rod 202, which is made up from the main rod 214, the first and second sub-rods 216, 218, is disposed displaceably along the axial direction (the direction of arrows A and B) inside the guide body 228, which is arranged inside the housing 52.

The first bellows 204 constituting the valve mechanism 56 is disposed on an outer circumferential side of the first sub-rod 216. The front end part 208 of the first bellows 204 is retained by the connecting shaft 220 of the main rod 214, whereas the rear end part 210 thereof is gripped between an end of the fixed member 80 disposed at the upper portion of the housing 52 and the cap 224 that is disposed inside the fixed member 80.

The second bellows 206 is disposed on an outer circumferential side of the second sub-rod 218. The connecting shaft 226 of the second sub-rod 218 is inserted through the front end part 208 of the second bellows 206, while the outer circumferential side thereof is inserted into and retained by the flange 116 that is formed on the lower end of the main rod 214.

Further, the rear end part 210 of the second bellows 206 is gripped between the end cover 96 that is installed into the lower portion of the housing 52 and the end of the guide body 228.

With the flow amount control valve 200 constructed in this manner, when the actuator 54 is driven, by separation of the valve element 110 of the main rod 214 from the valve seat 230, the fluid introduced from the inlet port 60 is guided into the interior of the guide body 228 through the introduction port 232, and the fluid then flows through the lead out port 234 while passing through the gap between the valve element 110 and the valve seat 230.

At this time, the fluid flows in between the outer circumferential surfaces of the first and second bellows 204, 206 and the inner circumferential surface of the guide body 228, whereby the pressure of the fluid is imposed radially inward with respect to the first and second bellows 204, 206. In addition, the fluid that is lead out from the lead out port 234 of the guide body 228 is directed to the exterior through the outlet port 62.

Figure 8:
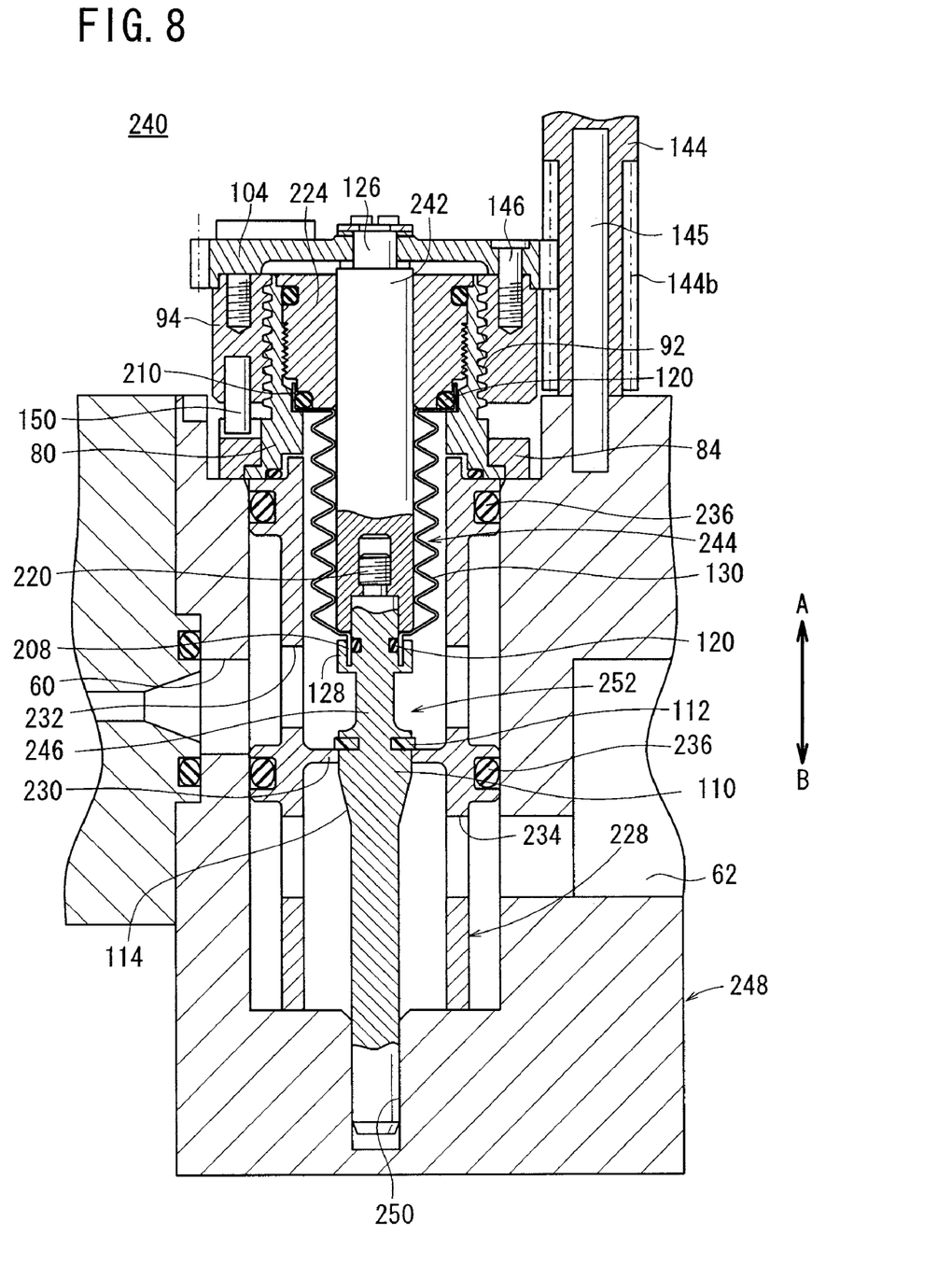
FIG. 8 is an enlarged vertical cross sectional view of essential elements, showing a modified example of the flow amount control valve illustrated in FIG. 7.

Further, in the above-described flow amount control valve 200, a structure has been described in which paired first and second bellows 204, 206 are disposed with respect to the rod 202 about a centrally arranged valve element 110. However, the present invention is not limited to such a structure. For example, in the flow amount control valve 240, as shown in FIG. 8, a structure comprising a single bellows 244 may also be provided, which is disposed only on the side of an upwardly arranged sub-rod 242. In this case, the lower end of the main rod 246, which is connected to the sub-rod 242, is supported displaceably in the axial direction with respect to a guide hole 250 of the housing 248.

By adopting such a structure, the valve mechanism 252 including the bellows 244 is simplified and the number of parts can be reduced. Also, the number of assembly steps required to assemble the flow amount control valve 240 can be reduced.

The flow amount control valve according to the present invention is not limited to the above-described embodiment, and various other structures may be adopted as a matter of course, which do not deviate from the essential nature and gist of the present invention.

What is claimed is:

1. A flow amount control valve, comprising:
    a housing including a pair of ports through which a fluid is introduced and discharged, a valve opening communicating with said ports and through which the fluid flows, and a valve seat that faces said valve opening;
    a rod disposed displaceably along said valve opening and having a valve element, said valve element being seatable on said valve seat;
    a guide member connected to an end of said rod and supported so as to be displaceable with respect to said housing while facing toward said valve opening; and
    a bellows supported between said housing and said rod, and said bellows being expandable and contractible along an axial direction under a displacement action of said rod,
    wherein said guide member and said valve opening including said valve seat are disposed on the same axis, and said bellows opens toward a side of said valve element and said valve seat inside said valve opening, and
    wherein said guide member includes a collar on an end thereof, which projects toward said rod and supports an end portion of said bellows.

2. The flow amount control valve according to claim 1, wherein said bellows comprises a pair of bellows disposed on both ends of said rod with said valve element arranged centrally therebetween.

3. The flow amount control valve according to claim 2, wherein said guide member comprises a pair of guide members disposed on both ends of said rod.

4. The flow amount control valve according to claim 3, wherein one end of said bellows is supported on an end of said rod and the other end of said bellows is supported on said housing, said bellows being disposed in a non-contact state with respect to an inner wall surface of said valve opening.

5. The flow amount control valve according to claim 1, wherein said bellows includes a bellows portion, which is bent in a wavy shape along the axial direction, said bellows portion being formed from a projecting part that projects with a triangular shape in cross section in a radially outward direction, and a recessed part adjacent to said projecting part that is recessed with a triangular shape in cross section in a radially inward direction.

6. The flow amount control valve according to claim 5, wherein a wall thickness T1 of said projecting part is smaller than a wall thickness T2 of said recessed part.

7. A flow amount control valve, comprising:
    a housing including a pair of ports through which a fluid is introduced and discharged, a valve opening communicating with said ports and through which the fluid flows, and a valve seat that faces said valve opening;
    a rod disposed displaceably along said valve opening and having a valve element, said valve element being seatable on said valve seat;
    a guide member connected to an end of said rod and supported so as to be displaceable with respect to said housing while facing toward said valve opening; and
    a bellows supported between said housing and said rod, said bellows being expandable and contractible along an axial direction under a displacement action of said rod,
    wherein said guide member and the valve opening including said valve seat are disposed on the same axis, and said bellows opens in a direction away from said valve element and said valve seat inside said valve opening, and wherein said guide member includes a collar on an end thereof, which projects away from said rod and supports an end portion of said bellows.

8. The flow amount control valve according to claim 7, wherein said bellows comprises a pair of bellows disposed on both ends of said rod with said valve element arranged centrally therebetween.

9. The flow amount control valve according to claim 8, wherein said guide member comprises a pair of guide members disposed on both ends of said rod.

10. The flow amount control valve according to claim 9, wherein one end of said bellows is supported on an end of said rod and the other end of said bellows is supported on said housing, said bellows being disposed in a non-contact state with respect to an inner wall surface of said valve opening.

* * * * *